Figure 1:
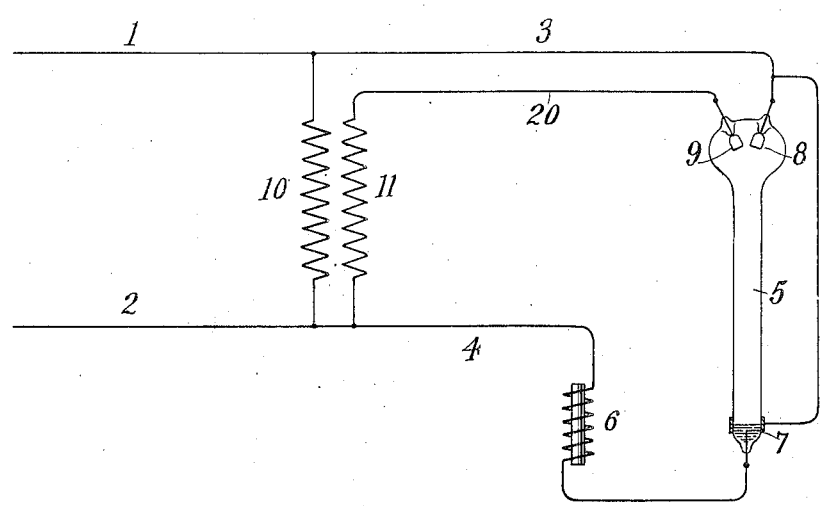

P. C. HEWITT.
ELECTRICAL DISTRIBUTION BY ALTERNATING CURRENTS.
APPLICATION FILED JUNE 4, 1903.

1,110,687.

Patented Sept. 15, 1914.

Witnesses:
Edw. L. Hitchcock
Wm. H. Capel

Inventor
Peter Cooper Hewitt
by Charles A. Terry Atty

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION BY ALTERNATING CURRENTS.

1,110,687. Specification of Letters Patent. Patented Sept. 15, 1914.

Original application filed April 25, 1903, Serial No. 154,304. Divided and this application filed June 4, 1903. Serial No. 160,034.

*To all whom it may concern:*

Be it known that I, PETER COOPER HEWITT, a citizen of the United States, and resident of New York, county of New York, State of New York, have invented certain new and useful Improvements in Electrical Distribution by Alternating Currents, of which the following is a specification.

It has been proposed to operate a direct current work circuit from a supply circuit fed by a source of alternating currents by interposing at a suitable point or points in the system one or more devices permitting the passage of current in one direction only. Under some conditions, the current thus delivered, though direct, tends to be intermittent to such a degree as to be in some cases objectionable. Such objectionable characteristics are noticeable, for example, when only like phases of a current derived from a single phase alternating current source are delivered directly to the work circuit through devices of the character mentioned above. If, in addition to the impulses thus directly supplied from the supply circuit to the work circuit, the latter could be impressed with supplemental impulses at times intermediate between the direct impulses, the flow of current would be much steadier. In other words, if currents of different phase from that of the supply circuit could be delivered to the work circuit, the desired degree of steadiness would be more nearly attained. The current taken from the secondary of a transformer is nearly opposite in phase to that of the primary circuit; so that if provision be made to pass current directly from the supply circuit to the work circuit in the manner already proposed, and also from the secondary of a transformer fed by the supply circuit, the secondary current, like the primary, passing through a device which permits current flow in only one direction, a much more nearly uniform supply of direct current will be obtained than without the use of the secondary current. In practice the current from the secondary may pass through the same device as that from the primary, in some instances, or it may pass through a separate device.

I have illustrated my invention in connection with a single phase alternating current supply circuit, although it is applicable to polyphase circuits as well. In either case, the primary and secondary impulses delivered to the work circuit will be approximately symmetrical in the sense that the phase distance between successive phases delivered to the work circuit will be approximately the same.

Figure 2:
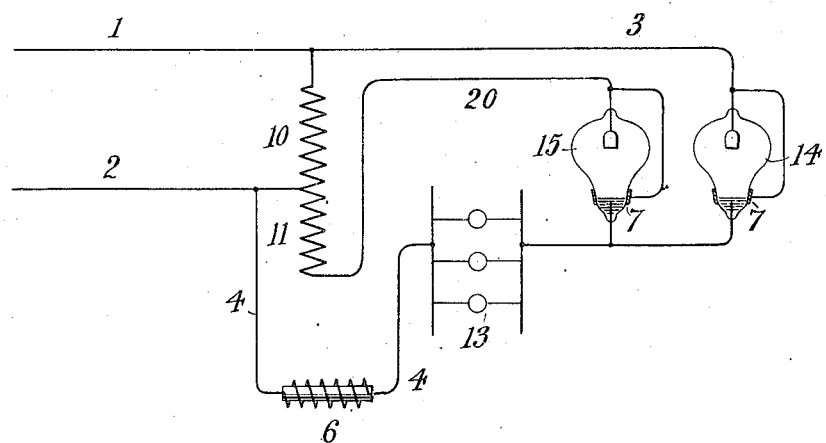

In the drawings, Figure 1 is a diagram of circuits embodying my invention and applied to the operation of a Cooper Hewitt lamp; and Fig. 2 illustrates diagrammatically another system of circuits constituting a modification.

Referring to Fig. 1 of the drawings, 1 and 2 are main conductors leading from any suitable source of single phase alternating currents, and 5 indicates in this instance a Cooper Hewitt lamp. This comprises a suitable container, two positive electrodes, 8 and 9, and a negative electrode, 7. A conductor, 3, leads from the main 1, to the positive electrode 8, and a conductor 4 leads from the conductor 2 to the negative electrode 7.

The primary coil 10 of a suitable transformer is connected between the mains 1 and 2. The secondary coil, 11, of this transformer has one terminal connected by a conductor, 20, with the electrode 9, while its other terminal is connected with the main conductor 2. A suitable inductive device, 6, may be connected in the conductor 4. Positive electric impulses upon the line 1, will traverse the lamp or translating device 5 by way of the conductor 3 and electrode 8, returning to the conductor 2 by way of the conductor 4. At the same time a positive impulse is impressed on electrode 8, there will be a negative impulse impressed on electrode 9, which will be held back by the device 5, but at the succeeding period, when a negative impulse is present at 8, and being held back, the positive impulse will be impressed on 9 and will be allowed to pass through the device so that there will be passing through the device in a positive direction currents from both the positive wave and the negative wave. The current from the coil 11, will be approximately 180° behind the current traversing the coil 10, and it will flow from one terminal through the conductor 20, electrode 9, translating device 5, electrode 7, and by way of conductor 4 to the other terminal of the coil 11.

The direction of windings of the coils 10 and 11, should be such that positive currents from the coil 11 will be delivered to the electrode 9 alternately with the positive impulses delivered to the electrode 8. It will thus be seen that the lamp 5, which in itself has the characteristic of permitting a flow of current in one direction only, is affected by two sets of impulses, one derived directly from the supply mains 1 and 2, and the other derived indirectly through the transformer 10—11. As these impulses represent phases which are practically opposite each other, the time at which impulses of one phase are impressed upon the lamp will be substantially intermediate between the times at which the other impulses are impressed upon it. This will tend to a comparative uniformity in the effects produced in the lamp itself.

For the purpose of so modifying the phases of the two sets of impulses as to provide a more or less continuous flow of current, one or more inductive devices, 6, may be inserted in a suitable portion of the circuit as, for instance, in the conductor 4, or in any other suitable position. The effects of this will be to more or less retard the successive current impulses and thus, as it were, to smooth out the resulting current causing it to be more or less undulatory in character, and preventing the occurrence of zero points.

In practice when the device 5 is used as an illuminating device, I have found that with such an organization there is such slight change of brilliancy on the part of the lamp that it appears as though operating on a continuous current. In this connection it may be stated that the same device may be employed as a continuous current translating device by employing a continuous current source and either one of the electrodes, 8 or 9, as the positive electrode, or the two may be connected in parallel so that as a translating device it may be used either in connection with a continuous or alternating current circuit.

In Fig. 2, a modification is shown in which two separate devices, 14 and 15, are employed for delivering current to a work circuit containing translating devices, 13, which may be of any desired character, or the two positive electrodes may be inserted in one of these devices as shown in Fig. 1, the vapor column being here practically eliminated. In this instance, the conductor 3 is connected to the positive electrode of the device, 14, while the negative electrode is connected with one side of the work circuit. The coil 10 is connected between the conductors 1 and 2 and the coil 11 is connected between the conductor 2 and the conductor 20 leading to the positive electrode of the other device 15, the negative electrode of which is connected with the same side of the work circuit as the negative electrode of the device 14. The other side of the work circuit is connected by the conductor 4, with the conductor 2, and an inductive device 6, may, if desired, be connected in the conductor 4, as in Fig. 1. In some instances, the inductive load of the work circuit will be such as to render the device 6 unadvisable.

In both the organizations shown in Fig. 1 and Fig. 2, it may be desired to so construct the transformer that no separate inductive device, as 6, may be desired. Such devices as 5, 14 and 15, offer considerable resistance to the initial passage of current therethrough, but when this is overcome in a given direction currents in that direction will flow with comparative ease, although they offer a practically prohibitive resistance to the flow of currents in the opposite direction under ordinary conditions of potential. If the conditions are such that the current falls to zero between each wave, then means should be provided for overcoming the initial resistance at each zero point, but if means are provided for producing a retardation of inductive effect sufficient to prevent the current from falling below the value required to prevent the initial resistance from reëstablishing itself, then there will be a continuous flow when once the current is started in a device such as is shown in Fig. 1. By using both the positive and negative waves in a manner such as herein described, the full output of the generator may be availed of. Any convenient well known means may be employed for overcoming the initial resistance in a given direction. Various other methods of connecting the circuits may be employed.

This application is a division of an application filed by me on the twenty-fifth day of April, 1903, Serial Number 154,304.

I claim as my invention:—

1. The combination with a gas or vapor electric device of the character described, having two positive electrodes and a common negative electrode, of a transformer having the terminals of its primary coil connected with one of the positive electrodes and the negative electrode, and the respective terminals of the secondary connected with the remaining positive electrode and the negative electrode.

2. The combination with a gas or vapor electric device of the character described, having two positive electrodes and a common negative electrode, of a transformer having the terminals of its primary coil connected with one of the positive electrodes and the negative electrode, and the respective terminals of the secondary connected with the remaining positive electrode and the negative electrode, and an inductive resistance in circuit with the device.

Signed at New York, in the county of New York, and State of New York, this 29th day of May, A. D. 1903.

PETER COOPER HEWITT.

Witnesses:
 WM. H. CAPEL,
 GEORGE H. STOCKBRIDGE.